Patented Apr. 4, 1944

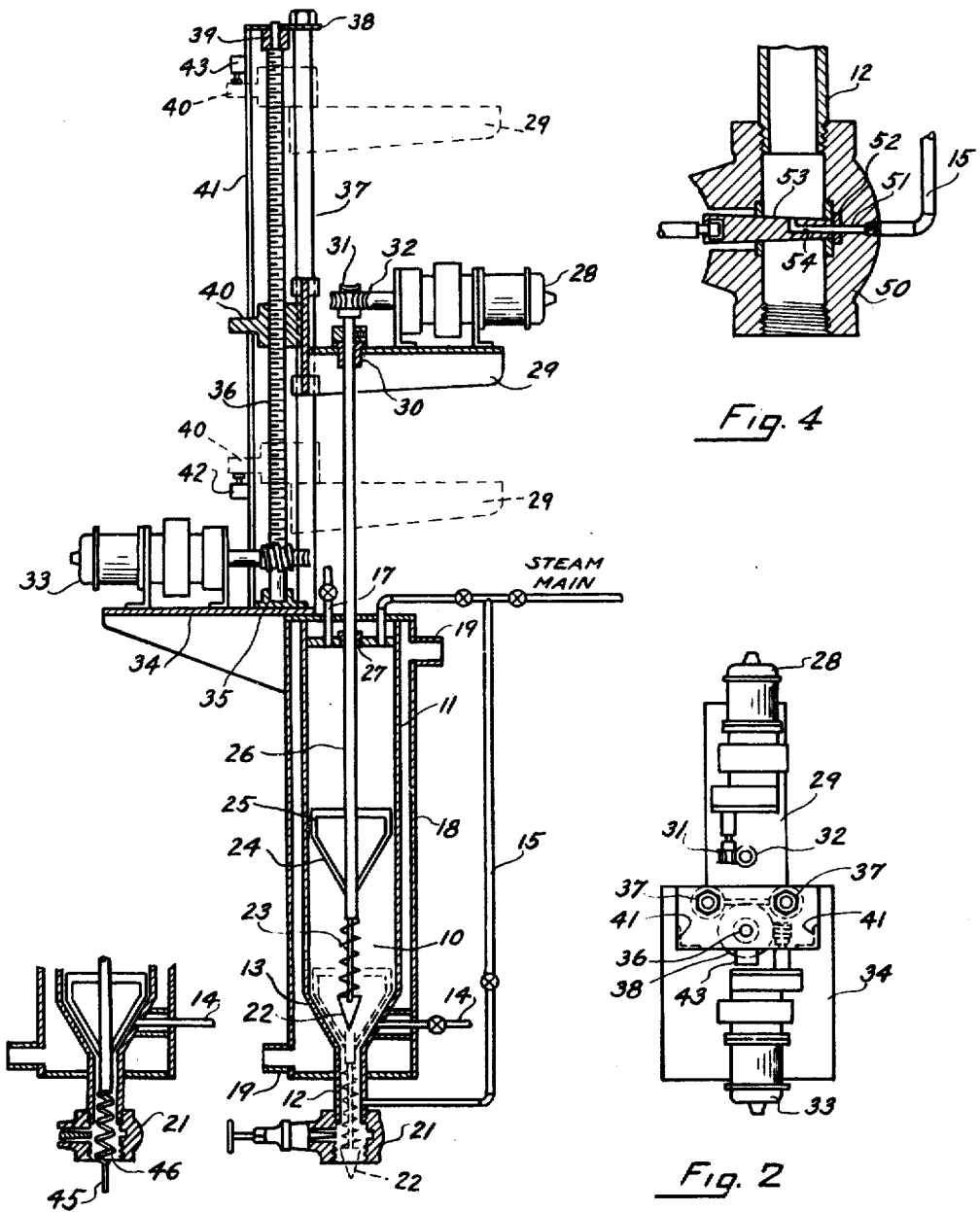

2,345,603

UNITED STATES PATENT OFFICE 2,345,603

RESIDUAL HYDROCARBON TREATMENT

Eugene J. Houdry, Ardmore, and Harry P. Broom, Haverford Township, Montgomery County, Pa., assignors to Houdry Process Corporation, Wilmington, Del., a corporation of Delaware Application February 15, 1940, Serial No. 319,008

6 Claims. (Cl. 196—122)

This invention relates to processes of and apparatus for the processing of residues or residual materials such as those derived from petroleum, shale oil, bituminous distillate, etc. and is closely related to and in certain respects is a further development of or improvement over the disclosures of the copending applications of Eugene J. Houdry, Serial No. 252,288, filed January 23, 1939, and Serial No. 287,972, filed August 2, 1939 which issued on September 9, 1941 as Patents Nos. 2,255,059 and 2,255,060, respectively. In particular, the invention is concerned with the treatment of a residual hydrocarbon material in a manner to remove therefrom all components such as ash, coke, tarry and resinous material, asphalt and other substances which are deleterious to the conversion of such residual material into more valuable products, such as motor fuels, domestic fuel oil and other lighter hydrocarbons. The invention also relates to ways and means of removing coky deposits resulting from the treating operation.

One object of the invention is to provide method and apparatus for preparing clean distillate material from heavy charging stock comprising or including bottoms or residues. Another object is to provide method and apparatus for physically separating the deleterious components out of such material so as to provide a clean charging stock in vapor phase for any further desired treatment. Another object is to provide apparatus directed to controlling the extent and character of the reaction on the residual material. Another object is to provide apparatus for separating the deleterious components in dry, soft or friable condition and collecting the separated matter in the treating chamber. Another object is directed to providing an improved scraping apparatus arranged to loosen and to remove the collected matter from the treating chamber.

The invention involves treating a stock comprising or containing residual material by removing therefrom any components not in vapor phase and segregating the components in the form of a soft dry deposit so as to provide clean volatile or distillate material suitable for fuel or for any desired conversion, transforming or other treating operations. The stock heated and at least partly in vapor phase, is supplied at or adjacent the lower end of a separating or coking chamber at a suitable rate and in such a manner as to permit expansion and agitation of the heated stock within the chamber so as to avoid any substantial formation therein of a liquid pool. When the stock is admitted above the extreme lower end of the chamber, steam or other vaporizable medium is supplied at or adjacent this end in order to effect the agitation and consequent vaporization of any liquid which may tend to form there. The heat required for the separating treatment is preferably supplied entirely, or substantially so, by the incoming heated stock including desirably the vaporizing medium. A large temperature drop within the separator or coking chamber is to be avoided and to prevent this it is desirable to maintain the walls of the chamber at a uniform temperature. The temperature of the chamber walls may be controlled in any known manner, but preferably it is done by circulating a heat exchange medium in direct heat exchange relation with the walls. When a mixed charge of the hydrocarbons and vaporizing medium is sent in at the bottom of the chamber for upward expansion, the effect is to maintain the liquids in a state of agitation therein until they vaporize and any entrained liquid or solid heavier particles fall, are thrown down or distill on the walls of the chamber to form a deposit of porous, friable mass, while the lighter vaporized components form a supernatant body which is discharged at or near the top of the chamber. The deposited mass may be purged by vacuum or by an inert fluid in order to dislodge any absorbed or adsorbed vapor or liquid and present the mass in a more friable condition for removal from the chamber by suitable scraping equipment. When the stock is supplied to the chamber at the bottom the incoming charge maintains a hole or passageway in the chamber through the falling or depositing heavier materials which accumulate on the chamber walls providing a hollowed coky body which may readily be removed by scraping or reaming means. When, however, the stock is supplied to the chamber at a point above its bottom, the falling heavier components will deposit on the bottom chamber wall and build up into a porous, semi-solid body of the accumulated material to the point of admission of the charging stock and thereabove it will deposit on the chamber side walls, so as to provide a hollowed deposit permitting passage of the incoming heated stock. In order to then remove the accumulated material a scraper capable of simultaneously drilling the solid or semi-solid portion and reaming the hollowed portion will be used. The separators are preferably operated in a battery of two or more in order to permit continuous operation of the separating or coking process by transferring the heated charging stock from one separator to another to permit removal of the coky deposit from the separator previously on stream.

The apparatus may be operated to produce a minimum amount of coky deposit by controlling the operating conditions so that little or no cracking of the residual hydrocarbon stock takes place in the separating chamber or, if it is desired to produce lighter hydrocarbons, such as naphtha, during the operation, the conditions of rate of feed of the charge and time of contact in the coking chamber may be regulated so as to permit some cracking with a consequent increase in the amount of coke deposit. The separator should not be operated at a temperature below 800° F. nor above 950° F. and the temperature drop between the inlet and outlet streams of the coker should not be more than 150° F. Usually the operating temperatures within the coking chamber are in the range of around 830° F. to 930° F. and the best operating temperatures to produce a minimum amount of coke from most residual stocks is between 850° F. and 900° F. In preparing the residual stock for charging to the coking chamber, the preliminary heating takes place under known conditions which prevent any substantial cracking. The quantity of vaporizing medium supplied to the coking chamber will vary with the type of residual charging stock and for most stocks will range from 2 to 30 per cent by weight of the charge. The size of the separating or coking chamber will be such as to permit the residual charge to expand and remain therein sufficiently long to separate out the heavier components. Ordinarily the time is less than 50 seconds and for some stocks 20 seconds or less is sufficient to separate the heavier components while producing a minimum of naphtha.

In order to illustrate the invention, reference may be made to the accompanying drawing, in which Fig. 1 is a view in elevation of the apparatus with portions thereof in section.

Fig. 2 is a plan view of the apparatus with portions removed for the purpose of clarity.

Figs. 3 and 4 are modified forms of details of the invention, shown in Fig. 1.

Referring to Fig. 1, 10 indicates generally a separator having an upper enlarged portion 11 which forms an expansion chamber and a reduced extension 12 at its lower end which is joined to the expansion chamber by means of an interconnecting tapered portion 13. The residual charge is supplied to the separator at a point adjacent its lower end through the line 14 and, as indicated, the line 14 is joined tangentially to the tapered portion 13 so that the incoming charge is given a swirling action as it enters the separator. Before admitting the charge to the casing the residual stock will be heated in a tube still or other suitable heater and conveyed to the separator at a relatively high rate so that the charge remains in substantially uncracked condition to avoid the formation of any coky deposit in the part of the apparatus which precedes the separator. If desired, steam or other inert medium may be mixed with the incoming charge during the heating step and it is preferably, as indicated, supplied from the steam main through line 15 to the lower reduced portion 12 in order to assist in maintaining the charge in the expansion chamber 11 in a sufficiently agitated and expanded condition and also to insure sufficient heat to release the solid components from the incoming heated charge.

The maintenance of the charge in a state of agitation within the expansion chamber permits solids or unvaporized portions of the charge to separate out and fall or deposit on the walls of the separator and build up to some level therein. The level which the deposit will attain depends on the residual stock being treated and conditions of its treatment, such as time of treatment, amount of cracking desired, etc. The components of the charge which are in vapor phase will rise and form a supernatant layer above the deposited components and will pass out of the expansion chamber 11 through the valved line 17 in clean condition and suitable for immediate thermal conversion, catalytic transformation or other desired treatment, to produce products of the same or different boiling range.

The thermal filtering or separating action which takes place in the expansion chamber 11 involves some viscosity breaking of the charge and the heat for this action is supplied by the heat of the incoming reactants, or if steam or other inert fluid is admixed therewith, by the combined heat of the charge and the inert fluid. Under ordinary conditions of operation, the charge alone or admixed with steam will enter the separator within the temperature range of 850-930° F. and to maintain the charge at the desired temperature for effecting the separation and in order to prevent too great temperature drop through the separator, it is provided with a chamber 18 surrounding its exterior walls through which a suitable temperature regulating fluid may be circulated. Inlet and outlet connections 19, 19, are in communication with the chamber 18 and will be provided with suitable apparatus for circulating a temperature regulating medium such as fused salts, metals of low melting point or alloys thereof, or other types of liquid which have a sufficiently low vapor pressure to maintain the liquid state under the conditions of its use. Heat may be supplied to the temperature regulating medium by suitable heat exchange means in the circulating apparatus or the heat may be supplied to the chamber walls by suitable direct heating means applied thereto.

The separators are preferably operated in batteries of two or more so that the incoming charge may be switched from one to another of the separators and provide a continuous operation of the separating process while permitting the coke which has been deposited in one casing to be removed therefrom by suitable scraping means, later to be described. The length of time in which a separator is on stream will depend on the size and shape of the particular casing and the rate of supply of the incoming heated residual stock. It is possible to design the casing and control the rate of the charge so that proper on-stream operation can be had for periods as great as six hours, but it is preferable to limit the on-stream period to less than two hours and even to as short a time as 30 minutes in order that the deposited coky components may be more easily removed. The feed rate per hour of the charge may vary in volume to that of the separator from about 1½:1 to as high as 5:1. The quantity of steam or other inert fluid fed with the charge to assist the vaporization and also to minimize the thermal cracking in the separator may run from 2 to 30% by weight of the charge.

During the operation of the separator the valve 21, fixed to the reduced lower end portion 12 of the casing, will be in closed position and at the start of the cleaning or scraping operation the valve will be moved to open position, as indicated in Fig. 1. The scraper is made up of two cooperating parts which consist of a lower drill section and an upper reamer section. The drill is made up of a flat tapered cutting end 22 which is fixed to an upper helicoid flight 23, while the reamer consists of a plurality of downwardly tapering blades 24 terminating in upper shoulders 25 which are disposed substantially parallel to and in scraping relation with the inner wall of expansion chamber 11. A shaft 26 extends into the separator 10 receiving the scraper members on its lower end and has an upper end portion extending outwardly of the separator through a bushing 27 permitting movement relative to the separator. As shown in Figs. 1 and 2, the shaft 26 and scraper members are rotated by means of a variable speed reversible motor 28 carried by a support 29 which supports the shaft 26 by means of a keyed bushing 30. Motor 28 drives a spiral gear 31 which in turn rotates another spiral gear 32 secured to the end of shaft 26. In order to raise and lower the shaft to reciprocate the scraper members within the separator 10, a second variable speed reversible motor 33 is provided and is carried by a support 34 which is in turn secured to the separator. The support 34, in addition, is provided with a bushing 35 for rotatably receiving the lower end of a lead screw 36 and a pair of guide posts 37—37 extend upwardly from the support 34 and have at their upper ends an arm 38 supporting a second bushing 39 for rotatably receiving the upper end of the lead screw 36. A travelling block 40 fixed to motor support 29 coacts with the lead screw 36 to raise or lower the scraper and its driving equipment according to the direction of rotation of the lead screw by the motor 33. An upright 41 is secured to the free end of the arm 38 in order to brace the same and it is also provided with means for automatically reversing the direction of rotation of the scraper which will later be described. The lead screw 36 is rotated in the desired direction through suitable gear driven by the motor 33.

While the separator is in operation the scraper will normally be positioned in the upper portion of the separator and the support 29, carrying the rotating motor 28, will take the position indicated in dotted lines at the upper end of the figure. After the separator has been in operation for a desired length of time and a coke deposit has formed therein, the motor 28 is started, to rotate the scraper, and the motor 33 may also be started to lower the scraper so that the cutting end 22 thereof is lowered, if necessary, to contact the deposited coke. Ordinarily the coke deposit will be loosened readily by means of the scraper and both motors may then be operated simultaneously so that the scraper will be advancing downwardly in the chamber during its rotation. However, the scraper may be rotated in the same plane for a sufficient length of time to loosen a section of the deposit in cases where the deposit is not readily removed and the scraper may then be intermittently lowered as desired by the operator and at a rate depending on the removability of the deposited material. During the advance of the scraper toward the lower end of the separator it is rotated in one direction so that the helicoid flight 23 of the drill lifts the loosened deposit and the cutter is rotated in the same direction until the cutting end 22 protrudes through the open end of the valve 21, as is indicated in dotted lines in Fig. 1. At this time the motor support 29 will be in the position indicated in dotted lines at about the center of the figure. When the scraper reaches this position relative to the separator the motor 28 is reversed so that the drill then operates to force the deposit outwardly of the open end of the valve 21. The reaming portion 24 of the scraper in its advance through the separator will ream out any deposit by means of the tapered blades and the shoulders 25 will scrape any deposit from the walls of the expansion chamber 11 and will advance to the position shown in dotted lines in Fig. 1 until the tapered blades coact with the tapered portion 13 of the chamber in removing any deposited material in this section. A gaseous medium, such as steam from the steam main, may be sent into the upper portion of the coking chamber before or during the scraping operation in order to assist in the dislodgment and ejection of the deposited coke.

In order to automatically reverse the direction of the rotation of the scraper, switches 42 and 43 are provided on the upright 41 and will be electrically connected with the motor 28 so that when the support 29 reaches its lowermost position the switch 42 will be closed by the travelling block 40 to reverse the motor 28 in order to rotate the scraper in a direction to force the deposited material out through the open end of the valve, while when the support 29 reaches its uppermost position, the block 40 will close the switch 43 and again reverse the direction of rotation of the scraper so that the drill portion 23 will operate to loosen and lift the material when the scraper is again advanced toward the end of the separator.

In Fig. 3 is shown a modified form of cutter in which the drill comprises a flat cutting end 45 similar to that shown in Fig. 1 while the drill portion consists of a helical spring 46 which operates, during the advance of the scraper toward the lower end of the separator, to cut through and loosen the deposited material without conveying the deposit upwardly. When this form of scraper is used it is necessary only to rotate the scraper in one direction and the automatic means for reversing the motor 28 will be dispensed with.

Fig. 4 shows a modified form of valve construction which is adapted to supply the inert fluid to the separator while the valve is in closed position and the separator is carrying out the coking process. The valve body 50 is provided with a drilled portion 51 extending through the valve seat 52 and cooperates with a drilled portion 54 in the valve gate 53 in order to place the drilled portion 51 in communication with the lower reduced portion 12 of the separator. The line 15 from the steam main will be secured in the drill portion 51 to the valve body for supplying any desired amount of steam during the coking operation.

Under certain conditions of operation, for example, when the charge is supplied to the separating chamber 10 at a fairly high rate, or when certain types of gravities of charging stock are used in the separating operation, coke or unvaporized portions of the charge may become entrained with the vapors and form in the upper portion of the chamber a suspension or emulsification which, if not broken up in order to knock out the entrained components, is at times carried overhead with the vapors through the line 17. In order to prevent or minimize this condition during the separating operation and to remove entrained material from suspension, the apparatus as disclosed, or in a slightly modified form, may be operated or arranged to break up the suspension. For example, during the separating operation the scraper in its uppermost position may be rotated for the purpose of further agitating or throwing down the material adjacent the top of the chamber or the reamer portion of the scraper may be replaced with one having curved vanes so that, in addition to breaking up the suspension, it will effect a centrifuging action tending to throw the heavier components downwardly and outwardly toward the chamber walls. Steam, or another extraneous fluid such as inert gas, oil, etc., may be passed from the steam main to the upper part of the chamber and sprayed therein to prevent the unvaporized components and solids from becoming entrained or for breaking up any suspension which may be formed.

From the above it will be seen that the present invention provides convenient and efficient means for converting residual hydrocarbons into clean distillate material and highly flexible and efficient power scraping equipment for quickly freeing the coking chamber of coky deposits. In fact it is entirely feasible to conduct a successful coking operation of the described type with only one chamber, since the latter can now be cleaned of coky deposits in a few minutes, during which period the hydrocarbon charge can be short-circuited through the heating equipment. When two or more chambers are utilized the coking reaction can be conducted, if desired, so as to effect a high degree of viscosity breaking with an attendant production of substantial amounts of naphtha, as up to 15 or 20% of the charge, since removal of considerable quantities of coky deposit is no longer so difficult as to require long shut-down periods.

We claim as our invention:

1. A casing having an upper chamber and a reduced lower end portion providing a communicating lower neck portion for the upper chamber, in combination with a device for removing matter accumulated in said casing, said device comprising a shaft having one end portion extending into the casing and another end portion exteriorly of the casing, a cutter including drilling means at the end of the shaft within the casing and reaming means disposed thereabove, means exterior of the casing for rotating said shaft, and other means for simultaneously lowering the shaft so as to drill through the accumulated matter, said drilling means being sufficiently large to scrape matter from the walls of the neck portion and said reaming means being sufficiently large to scrape matter from the walls of the upper chamber.

2. A cylindrical casing having an enlarged upper end portion and a reduced lower end portion interconnected by a tapered intermediate portion, in combination with a device for removing matter accumulated in said casing, said device comprising a shaft having one end portion extending into the casing and another end portion exteriorly of the casing, helical drilling means at the end of the shaft within the casing and tapered reaming means disposed thereabove, means exterior of the casing for rotating said shaft so as simultaneously to drill through and ream out accumulated matter in the casing, both said drilling means and said reaming means being adapted to remove material from the walls of the reduced lower end portion and tapered portion respectively, other means for selectively advancing the shaft toward the bottom of the casing until said reaming means is in operative scraping relation with the tapered intermediate portion of the casing and said drilling means has its free end portion positioned exteriorly of the reduced end portion of the casing.

3. An upright casing providing a chamber and adapted for hydrocarbon treating processes wherein coke is deposited in the casing during the treatment, outlet means in the bottom of the casing, in combination with means for cooperating with said outlet means for removing coke from the chamber, said means comprising a helical drill, motor means for rotating said drill in one direction in order to loosen the coke in the chamber and means for advancing the drill toward the bottom of the casing until the cutting end of the drill extends through said casing outlet means, switch means operable at the end of the advance movement of the drill for reversing said motor means and rotating the drill in the other direction to force the coke through said outlet means.

4. An upright casing having an enlarged upper expansion chamber and a lower communicating reduced end portion, said casing being adapted for hydrocarbon treatment wherein coke is deposited in the casing during the treatment, outlet means in the bottom of the casing, in combination with means for removing coke from the chamber, said means comprising an upper reamer and a lower helical drill, motor means for rotating said reamer and drill in one direction in order to loosen the coke in the casing and means for advancing them toward the bottom until the cutting end of the drill extends through said casing outlet means, switch means operable at the end of the advance movement of the drill and reamer for reversing said motor means and rotating the drill and reamer in the other direction to force the coke through said outlet means.

5. An upright casing providing a chamber adapted for hydrocarbon treating processes wherein coke is deposited in the casing during the treatment, outlet means in the bottom of said casing, in combination with scraping means for cooperating with said outlet means for removing coke from the chamber, said scraping means comprising a lower helical drill and an upper tapered reamer positioned within the casing and adapted simultaneously to drill through and ream out the deposited coke, motor means for rotating said scraping means in one direction in order to drill through the coke in the chamber and means for advancing the scraping means toward the bottom of the casing until the cutting end of the drill extends through said casing outlet means, switch means operable at the end of the advance movement of the scraping means for reversing said motor means and rotating the scraping means in othe other direction to force the coke through said outlet means.

6. An upright casing providing a chamber and adapted for hydrocarbon treating processes wherein coke is deposited in the casing during the treatment, outlet means in the bottom of the casing, in combination with means for cooperating with said outlet means for removing coke from the chamber, said means including a helical drill, motor means for rotating said drill in one direction to loosen the coke, motor means for advancing the drill toward the bottom of the casing during the coke-loosening operation until the cutting edge of the drill extends through said outlet means, switch means operative at the end of the advance movement of the drill for reversing the first mentioned motor means and causing the rotation of the drill in the other direction to force the coke through said outlet means, and means for supplying a gaseous medium to said chamber to assist in the coke removal.

EUGENE J. HOUDRY.
HARRY P. BROOM.